(12) United States Patent
Bourgeois

(10) Patent No.: US 8,814,264 B2
(45) Date of Patent: Aug. 26, 2014

(54) ANCHOR MEANS AND SEATPOST FOR A BICYCLE SADDLE

(75) Inventor: Vincent Bourgeois, Bassano Del Grappa (IT)

(73) Assignee: Selle Royal S.p.A., Pozzoleone (IT)

( * ) Notice: Subject to any disclaimer, the term of this patent is extended or adjusted under 35 U.S.C. 154(b) by 375 days.

(21) Appl. No.: 13/132,820

(22) PCT Filed: Dec. 5, 2008

(86) PCT No.: PCT/IB2008/003356
§ 371 (c)(1),
(2), (4) Date: Aug. 19, 2011

(87) PCT Pub. No.: WO2010/064070
PCT Pub. Date: Jun. 10, 2010

(65) Prior Publication Data
US 2011/0291446 A1 Dec. 1, 2011

(51) Int. Cl.
*B62J 1/00* (2006.01)
(52) U.S. Cl.
USPC .................................. 297/215.14; 297/215.15
(58) Field of Classification Search
USPC .............................. 297/195.1, 215.14, 215.15
See application file for complete search history.

(56) References Cited

U.S. PATENT DOCUMENTS

| 3,933,391 | A | * | 1/1976 | Shook | 297/215.14 |
| 3,992,054 | A | * | 11/1976 | Campagnolo | 297/215.15 |
| 4,275,922 | A | * | 6/1981 | Juy | 297/215.14 |
| 4,995,753 | A | * | 2/1991 | Shook | 403/24 |
| 5,466,042 | A | * | 11/1995 | Herman | 297/215.15 |
| 5,501,506 | A | * | 3/1996 | Kao | 297/215.15 |
| 5,649,738 | A | | 7/1997 | Thomson et al. | |
| 5,664,829 | A | * | 9/1997 | Thomson et al. | 297/215.14 |
| 5,988,741 | A | * | 11/1999 | Voss et al. | 297/215.15 |
| 7,559,604 | B2 | * | 7/2009 | Beaulieu | 297/215.15 |
| 7,562,932 | B2 | * | 7/2009 | Chiang | 297/195.1 |
| 7,562,933 | B1 | * | 7/2009 | Chao et al. | 297/215.13 |

FOREIGN PATENT DOCUMENTS

DE 9405110 U1 5/1994
DE 202007015382 U1 1/2008

* cited by examiner

*Primary Examiner* — Peter Brown
(74) *Attorney, Agent, or Firm* — Tutunjian & Bitetto, P.C.

(57) ABSTRACT

A saddle support includes a pipe and a fixing clamp with a tightening lower plate and a tightening upper plate mounted at one upper end of the pipe and able to solidly tighten one or more support elements for supporting the saddle.

13 Claims, 6 Drawing Sheets

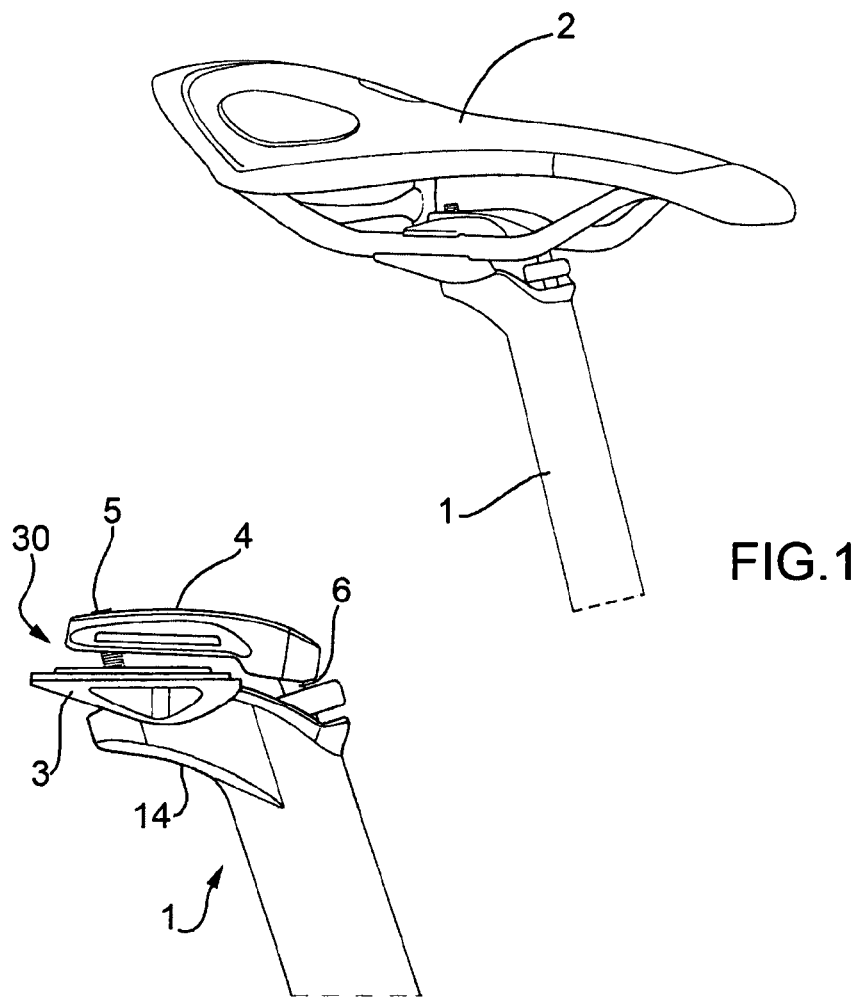
FIG.1
FIG.2
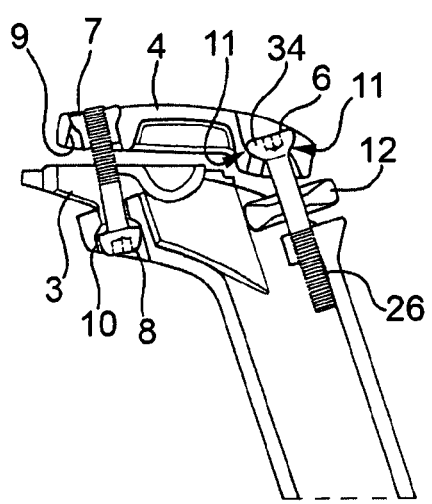
FIG.3
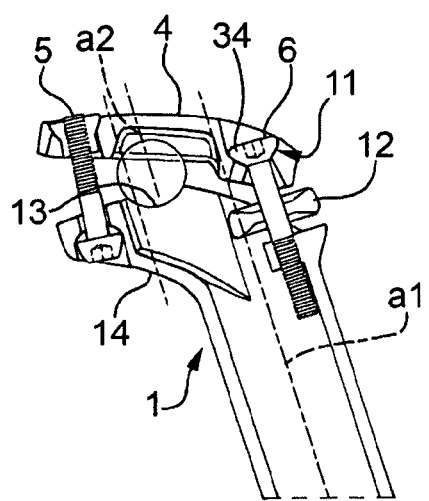
FIG.4

ANCHOR MEANS AND SEATPOST FOR A BICYCLE SADDLE

TECHNICAL FIELD

This invention relates to a fixing sleeve for bicycle saddles.

In more detail, the invention relates to a saddle support sleeve of the type with a high performance/weight, ratio, equipped with an adjustable clamp for fixing the saddles with a "fork" support, of both round and oval section.

BACKGROUND

At the current time, fixing sleeves for bicycle saddles are known, of the type described, e.g., in documents nos. EP0842083 and 085649738.

Sleeves of the known type however have some limitations concerning the simplicity and reliability of the saddle installation.

Further drawbacks of the sleeves of the known type concern the overall dimensions of the fixing means, and the load capacity compared to the weight of the sleeve.

SUMMARY

This invention intends to overcome the drawbacks of the known solutions and propose a fixing sleeve for bicycle saddles which is both easy to use, and of a lightweight, and yet at the same, time resistant construction.

This result is achieved with a sleeve as claimed in one or more of the enclosed claims.

A first advantage of the invention lies in the fact that the structure of the sleeve of this invention allows a reduction in the weight of the sleeve without compromising high performance.

A further advantage is offered by the possibility of mounting the saddle sideways, avoiding the need to remove the upper fixing plate of the clamp.

Another further advantage consists of the possibility of mounting saddles with an oval sectioned fork as well as a round sectioned one.

Another further advantage consists of limited side and upper overall dimensions.

Another further advantage consists of the possibility of mounting the saddles in a laterally inclined position.

Another further advantage consists of the possibility of containing at least one of the tightening screws of the clamp inside the sleeve pipe.

BRIEF DESCRIPTION OF THE DRAWINGS

These and other advantages will be better understood by any technician in this field by the description that follows and by the enclosed drawings, given not as an exclusive and limiting example, in which:

FIG. 1 shows a sleeve as claimed in the invention with a saddle mounted with fork support;

FIGS. 2-4 show a side view detail of the sleeve clamp, with some parts removed for a better display;

DETAILED DESCRIPTION OF PREFERRED EMBODIMENTS

Figure 5:
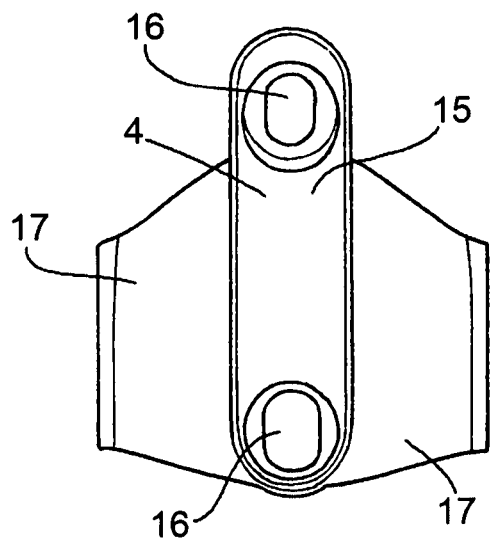
FIG. 5 shows a top view of an upper plate of the sleeve clamp.
Figure 6:
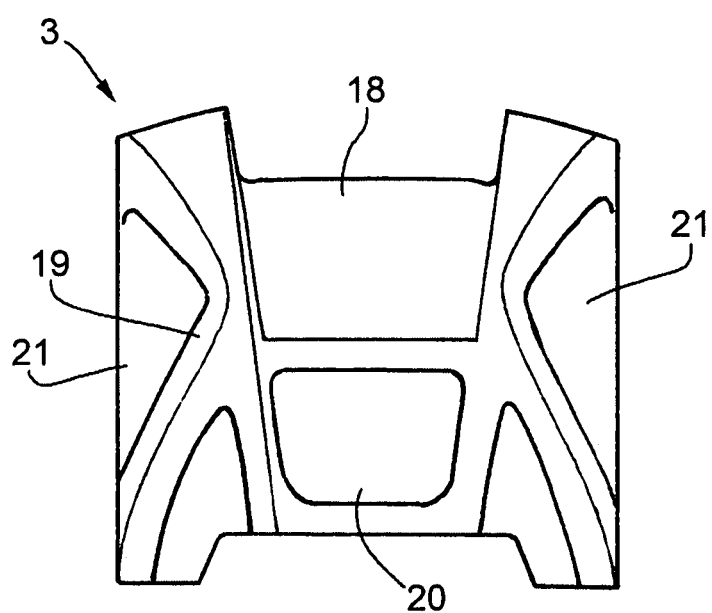
FIGS. 6-7 show a top and side view of the lower plate of the sleeve clamp.
Figure 7:
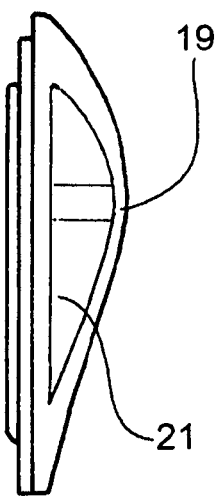
Figure 8:
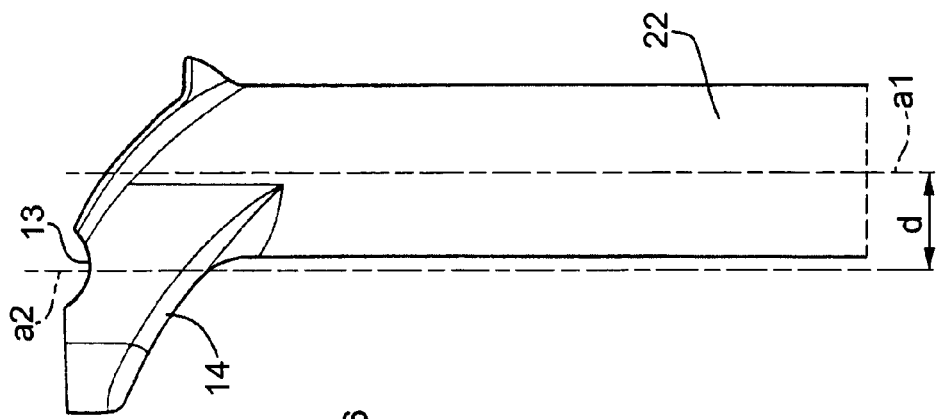
FIGS. 8-11 show a detail in a perspective, side, bottom and top view respectively of the sleeve pipe.
Figure 9:
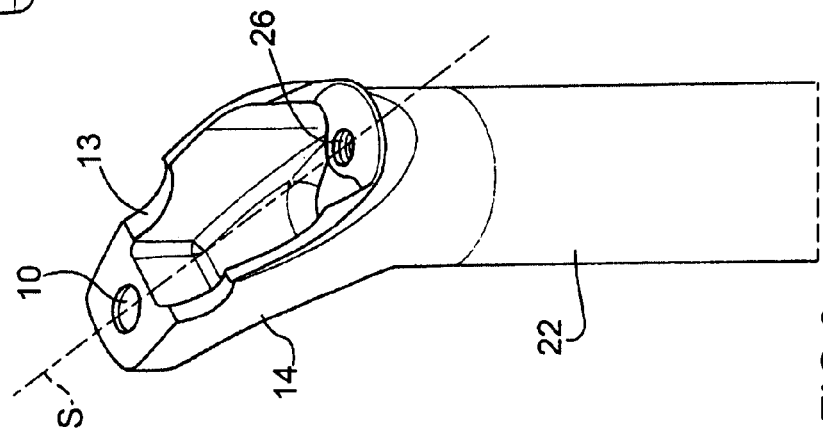
Figure 10:
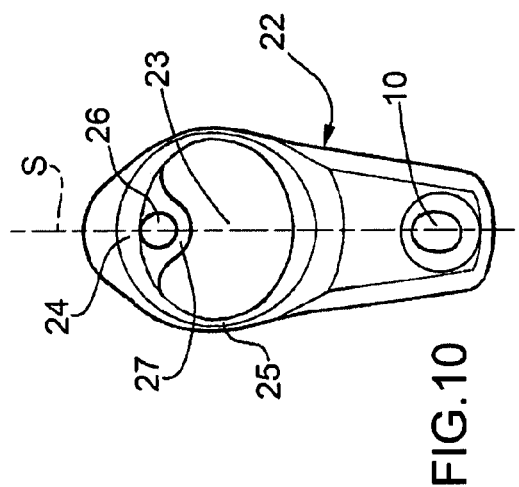
Figure 11:
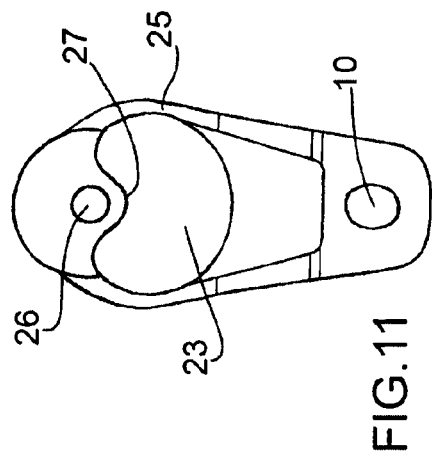
Figure 14:
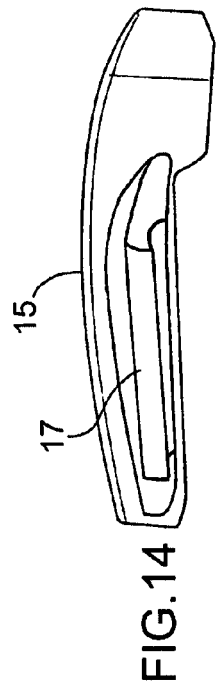
FIGS. 12-16 show a detail in a perspective, top, side, front and rear view respectively of the upper plate of the sleeve clamp.
Figure 15:
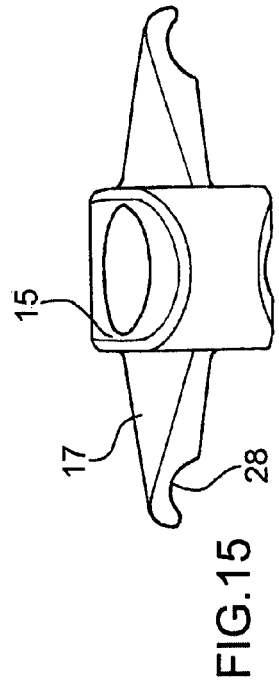
Figure 16:
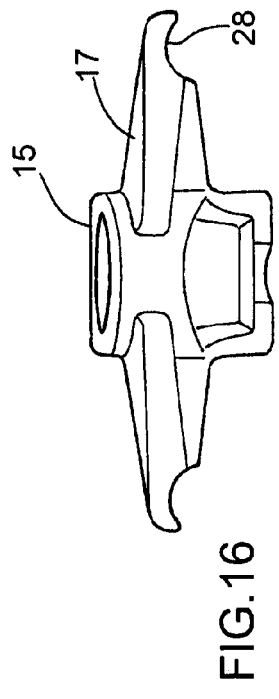
Figure 13:
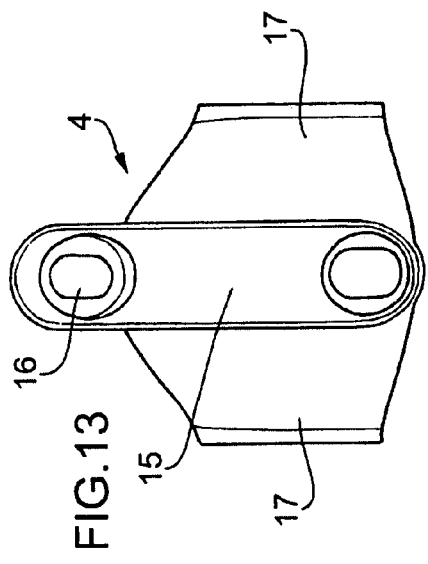
Figure 12:
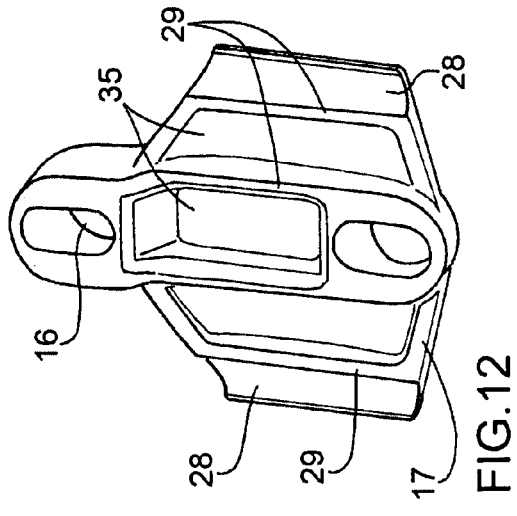

Referring to the drawings, a saddle support sleeve 1 as claimed in the invention for fixing a saddle 2 to a bicycle frame, comprises:

a pipe 22 intended to be fitted in the frame (not shown) of a bicycle and having walls preferably of a differentiated thickness, with the side walls 25 of a smaller thickness than that of the front and rear walls 24;

a fixing clamp 30 mounted on one upper end 14 of the pipe 22 and with a lower plate 3 and an upper plate 4 which can be mutually tightened to solidly fix the elements 39 of the support fork of the saddle;

tightening elements of the clamp made preferably of screws 5, 6 which act between the pipe 22 and the upper plate 4 of the clamp.

In more detail, in the upper part, the pipe 22 ends with an eccentric overhang 14 with respect to the axis a1 of the pipe 22 which constitutes the fixing portion of the pipe 22 to the clamp 30.

The pipe 22, the eccentric overhang 14 and the clamp 30 can be obtained by forging, or mechanical processing for chipping removal, in aluminum or other compound material.

The lower plate 3 of the clamp is H-shaped, composed of a crosspiece 18 with an arched external shape, e.g., a circular shape, which is housed in a swinging manner in a corresponding curved recess 13 of the portion 14, having a medium axis (a2) which is longitudinally staggered by a distance (d) with respect to the axis (a1) of pipe 22.

To the sides of the crosspiece 18, two fins 21 protrude, in which longitudinal seats 36 are obtained which house the elements 39 of the saddle fork and which in use are opposite to corresponding side fins 17 of the upper plate 4 which have in turn longitudinal seats 28.

It should be noted how the side fins 17 can be shorter than the corresponding seats 36 on the lower plate 3.

For example, the side fins 17 of the upper plate 4 can have a length of less than approximately 30 mm, and the longitudinal seats 28 of the lower plate 3 may be of a length of more than approximately 40 mm, so that the difference in length between the upper plate 4 and the lower plate 3 is at least approximately 10 mm.

The upper plate 4 is in turn fitted with holes 16 made along the central section 15 to allow the passage of the tightening screws 5, 6, in a position which is not aligned with the axis a1 along the longitudinal direction S.

Preferably, the rear screw 5 passes through a hole 10 of the end 14 and can be turned from the outside (from underneath in the example shown) to tighten a nut 7 with an external spherical shape 32, which nut 7 is housed in a corresponding spherical bed 9 obtained in the central portion 15 of the upper plate.

Alternatively, in place of the spherical nut 7, any connection means can be used that is suitable for assuring the spherical coupling with the upper plate 4.

With this solution, it is possible to obtain the relative inclining of the saddle, while reducing the height of the clamp.

Preferably, the nut 7 also has a portion 31 of a non-circular external shape which stops it from rotating when the screw is tightened.

The front screw 6 has in turn a head 34, preferably of a spherical external shape, housed in a second spherical bed 11 of the upper plate 4 and which engages at the other end with a thread 26 made in a thickness 27 in the internal cavity 23 of the pipe 22.

Also in this case, alternatively, in place of the front screw 6 with spherical head 34, any connection means can be used that is suitable for assuring the spherical coupling with the upper plate 4.

Preferably, the screw 6 is also turned by a threaded washer 12 which is also manually accessible from the outside.

According to the invention, with the aim of reducing the height of the sleeve and therefore increasing the existing gap with the saddle, the lower plate 3 and upper plate 4 have respective strengthening ribs 19, 29 and cavities 35.

With this solution, in particular in the central part of the saddle, it is possible to leave adequate space to bend the saddle, limiting the risks of knocking against the fixing clamp.

The plates 3, 4 also have the edges, in particular the front and rear edges, which are rounded and joined with the aim of preventing breakages during use when the sleeve components are under bending stress.

In use, the lower plate 3 is arranged on the pipe 22 with the curved portion 18 swinging in the recess 13, and the upper plate 4 is placed over the plate 3 so that the longitudinal seats 28/36 are substantially opposite.

Figure 18:
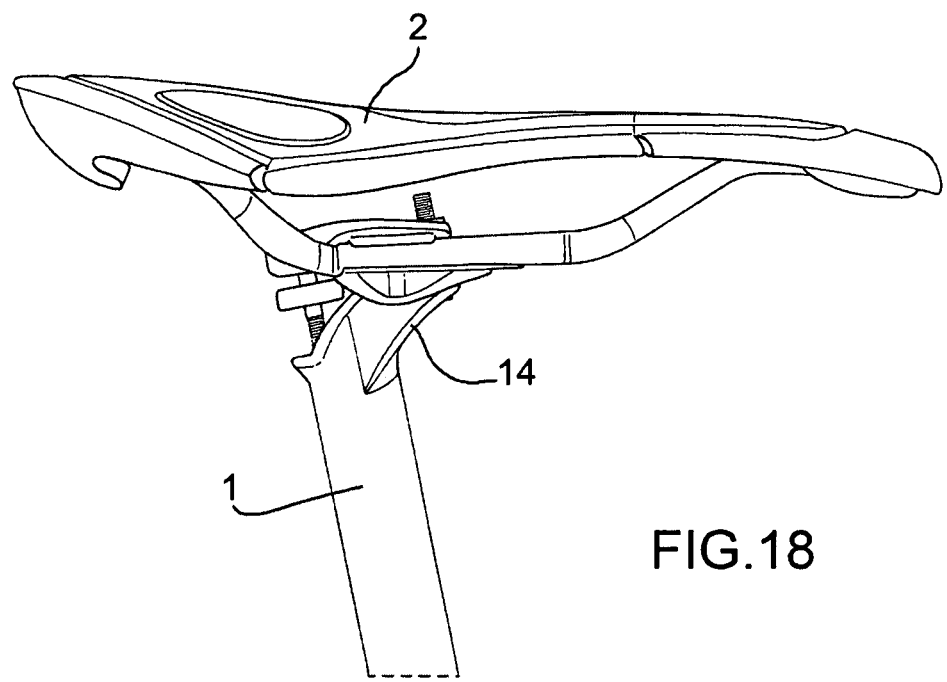
FIG. 18 shows a mounted saddle with a front overhang over the sleeve as claimed in the invention.
Figure 19:
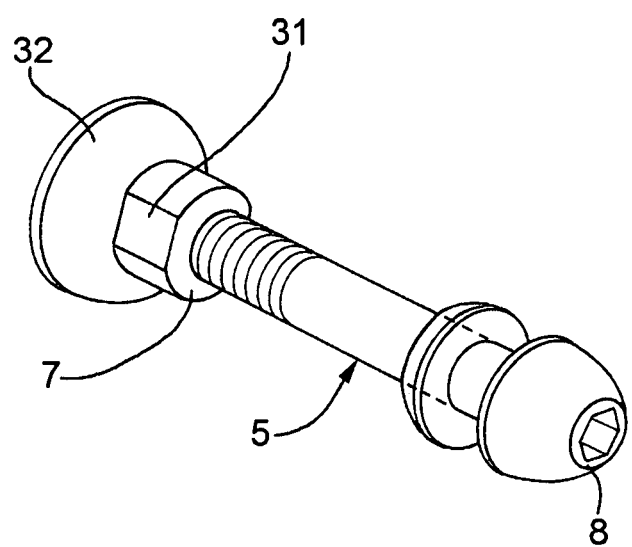
FIG. 19 shows a detail of a tightening screw of the sleeve clamp.

According to the preferences of the user, the sleeve 1 may advantageously be arranged with the overhang 14 facing backwards (FIG. 1) or forwards (FIG. 18).

In both cases, the screws 5, 6 may easily be fitted to fix the upper plate 4 to the overhang 14 of the pipe 22 with the lower plate 3 placed in the middle.

Figure 17:
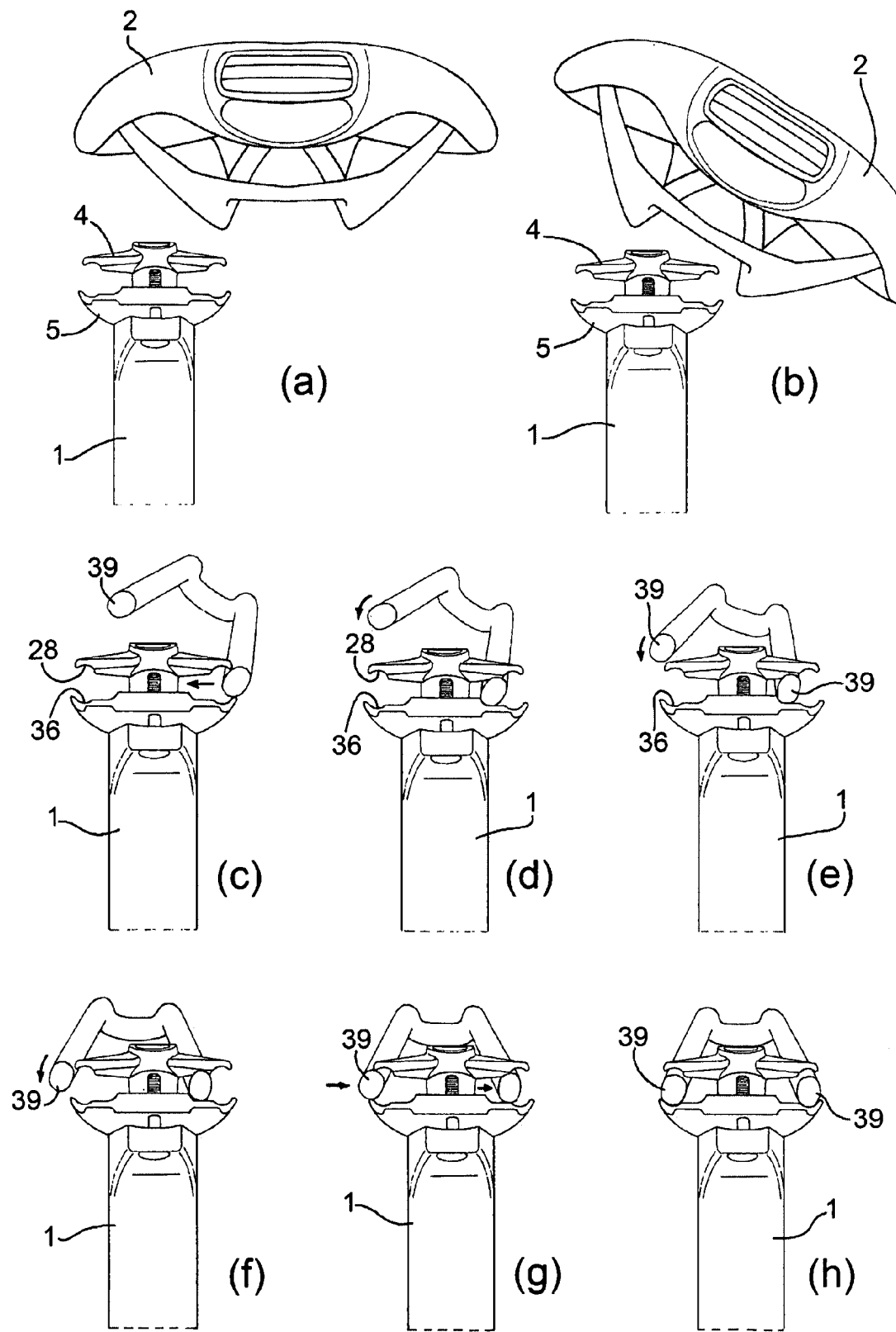
FIGS. 17 a-h show the following phases of mounting a saddle with a sleeve as claimed in the invention.

To mount the saddle 2, it is possible to proceed as illustrated in FIGS. 17 *a-h*, inserting sideways first one of the two saddle support elements 39, and then the second element 39, then tightening the screws 5 and 6 and finally fixing the saddle to the clamp and the latter to the pipe 22.

Advantageously, this operation is made easier by the relative transversal width of the fins 17 of the plate 4 and by the spherical shape of the fixing screws which allow the relative sideways opening of the clamp even without having to fully remove the screws.

Again advantageously, during tightening, it is possible to maneuver the two screws to incline the saddle using the swinging coupling mechanism between the lower plate 3 and the recess 13.

In particular, the screw 6 can be easily turned using the washer 12, and the screw 5 using an appropriate tool, such as a hexagonal spanner.

Furthermore both screws 5 and 6 can have, as stated, a head of a spherical shape which fits into the corresponding spherical recesses on the upper plate 4, allowing a partial possibility to incline the saddle sideways.

This invention has been described using preferred embodiments, but equivalent variants may be designed without falling outside of the field of protection offered by the claims.

The invention claimed is:

1. Fixing sleeve for saddles of a bicycle, comprising a pipe and a fixing clamp with a tightening lower plate and a tightening upper plate mounted at one upper end of the pipe and able to solidly tighten one or more support elements for supporting said saddle, said plates being tightened by means of at least two tightening elements arranged substantially along a longitudinal axis, at least one of said tightening elements being housed at least partially hidden inside said pipe, said upper plate being made of a central section with holes to allow the passage of said tightening elements and of two free side fins having longitudinal seats extending along the whole length of said upper plate, said lower plate being substantially H-shaped with a crosspiece having an arched external shape, which is intended to be housed in a swinging manner in a corresponding curved recess of the end of the pipe and on the sides of which are two fins which in use are opposite to the side fins of the upper plate, in said fins being obtained longitudinal seats, extending along the whole length of said lower plate, which house the supporting elements of the saddle, said tightening elements comprising a screw passing through a hole of the end and can be turned from the outside to tighten a nut with an external spherical shape, or connection means suitable for assuring a spherical coupling, housed in a corresponding spherical bed of the upper plate, said tightening elements further comprising a screw, having a head of spherical external shape housed in a second spherical bed of the upper plate, and which engages at the other end with a thread made has a differentiated in a thickness in the internal cavity of the pipe.

2. Sleeve as claimed in claim 1, wherein said free side fins have a length of less than approximately 30 mm.

3. Sleeve as claimed in claim 2, wherein said longitudinal seats of the lower plate are of a length of more than approximately 40 mm.

4. Sleeve as claimed in claim 3, wherein the difference in length between the side fins and the longitudinal seats is at least of approximately 10 mm.

5. Sleeve as claimed in claim 1, wherein said end overhangs eccentrically with respect to an axis (a1) of the pipe so that a medium axis (a2) of the recess is longitudinally staggered (d) with respect to the axis (a1) of the pipe.

6. Sleeve as claimed in claim 1, wherein
said screw can be turned manually by a threaded washer accessible from outside.

7. Sleeve as claimed in claim 1, wherein said lower plate and upper plate have at least front and rear edges rounded and joined to prevent breakages.

8. Sleeve as claimed in claim 1, wherein at least one of said lower plate and upper plate have strengthening ribs and cavities.

9. Sleeve as claimed in claim 1, wherein said clamp is obtained by forging in aluminum or other compound material.

10. Sleeve as claimed in claim 1, wherein said pipe and said upper end of the pipe are obtained by forging, or mechanical processing for chipping removal, in aluminum or other compound material.

11. The sleeve as claimed in claim 1, wherein said pipe has a differentiated thickness, with the side walls being of a smaller thickness than that of front and rear walls.

12. Fixing sleeve for saddles of bicycle, comprising a pipe and a fixing clamp with a tightening lower plate and a tightening upper plate mounted at one upper end of the pipe and able to solidly tighten one or more support elements for supporting said saddle, said plates being tightened by means of tightening elements arranged substantially along a longitudinal axis (S), at least one of said tightening elements being housed at least partially hidden inside said pipe, said upper plate being made of a central section with holes to allow the passage of said tightening elements and of two free side fins having longitudinal seats extending along the whole length of said upper plate, said lower plate being substantially H-shaped with a crosspiece having an arched external shape, which is intended to be housed in a swinging manner in a corresponding curved recess of the end of the pipe and on the sides of which are two fins which in use are opposite to the side fins of the upper plate, in said fins being obtained longitudinal seats, extending along the whole length of said lower plate, which house the supporting elements of the saddle, said tightening elements comprising a screw passing through a hole of the end and can be turned from the outside to tighten a nut with an external spherical shape, or connection means suitable for assuring a spherical coupling, housed in a corresponding spherical bed of the upper plate, said tightening elements further comprising a screw, having a head of spherical external shape housed in a second spherical bed of the upper plate, and which engages at the other end with a thread made in a thickness in the internal cavity of the pipe, said longitudinal seats of the lower plate being of a length of more than approx. 40 mm.

13. Fixing sleeve for saddles of bicycle, comprising a pipe and a fixing clamp with a tightening lower plate and a tightening upper plate mounted at one upper end of the pipe and able to solidly tighten one or more support elements for supporting said saddle, said plates being tightened by means of tightening elements arranged substantially along a longitudinal axis (S), at least one of said tightening elements being housed at least partially hidden inside said pipe, said upper plate being made of a central section with holes to allow the passage of said tightening elements and of two free side fins having longitudinal seats extending along the whole length of said upper plate, said lower plate being substantially H-shaped with a crosspiece having an arched external shape, which is intended to be housed in a swinging manner in a corresponding curved recess of the end of the pipe and on the sides of which are two fins which in use are opposite to the side fins of the upper plate, in said fins being obtained longitudinal seats, extending along the whole length of said lower plate, which house the supporting elements of the saddle, said tightening elements comprising a screw passing through a hole of the end and can be turned from the outside to tighten a nut with an external spherical shape, or connection means suitable for assuring a spherical coupling, housed in a corresponding spherical bed of the upper plate, said tightening elements further comprising a screw, having a head of spherical external shape housed in a second spherical bed of the upper plate, and which engages at the other end with a thread made in a thickness in the internal cavity of the pipe, the difference in length between said side fins and said longitudinal seats being at least of approx. 10 mm.

\* \* \* \* \*